Sept. 25, 1951 L. VANLEIRSBERGHE 2,568,874
PORTABLE TOOL FOR FORCING A TIRE BEAD FROM ITS
ASSOCIATED RIM FLANGES
Filed Feb. 19, 1946 2 Sheets-Sheet 2

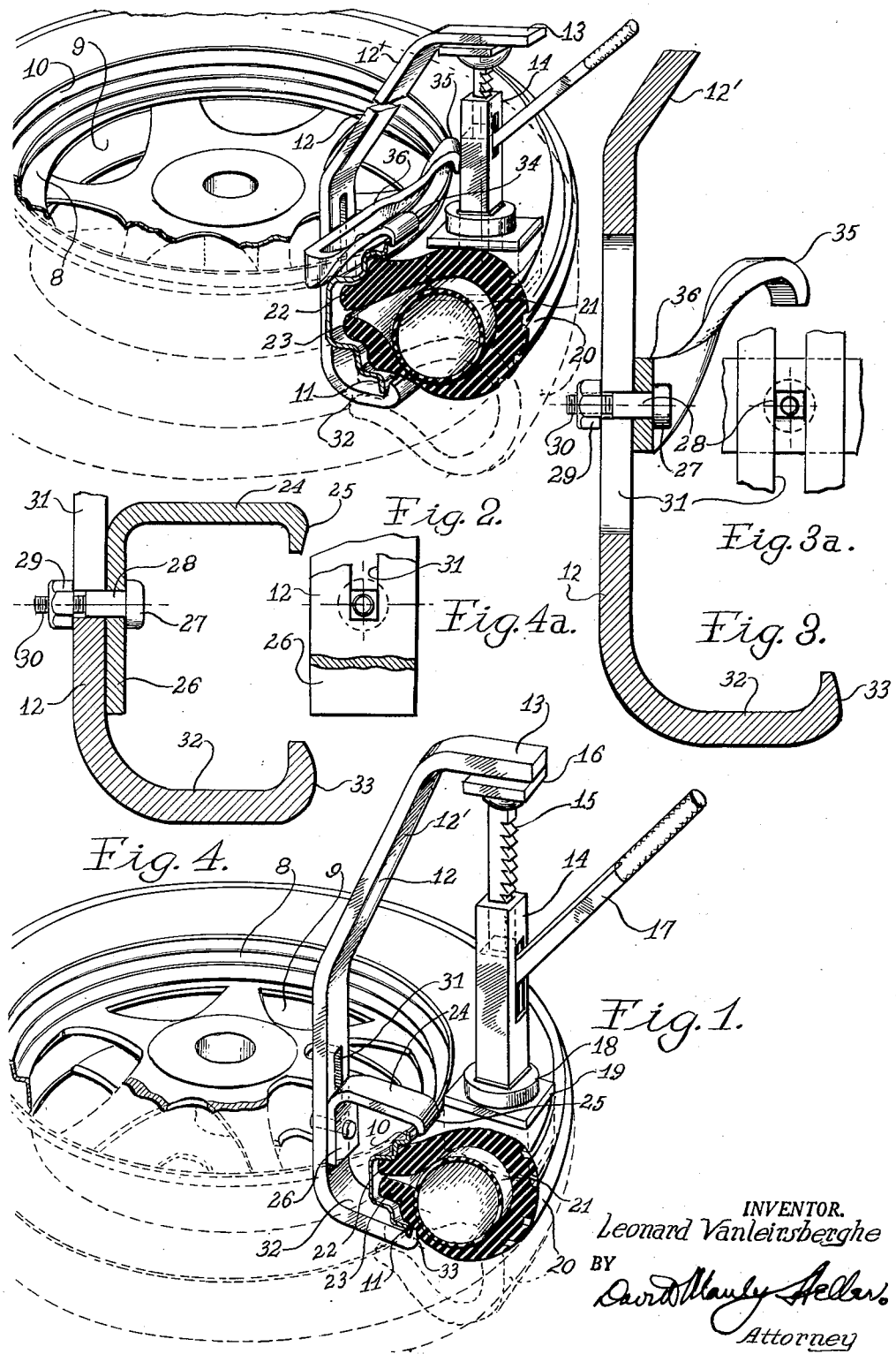

INVENTOR.
Leonard Vanleirsberghe
BY
Attorney

– Patented Sept. 25, 1951

2,568,874

UNITED STATES PATENT OFFICE 2,568,874

PORTABLE TOOL FOR FORCING A TIRE BEAD FROM ITS ASSOCIATED RIM FLANGES

Leonard Vanleirsberghe, La Grange Park, Ill.

Application February 19, 1946, Serial No. 648,585

2 Claims. (Cl. 157—1.26)

My invention relates to tire removing tools, used in removing tires from automobile wheels or rims.

One object of my invention is to provide a tire removing tool of the aforementioned character, in which a frame-work is provided for gripping the flanges of a rim or tire wheel, the said frame-work having an extended portion projecting over, and in alignment with the above tire, in order to permit the interposition of a standard automobile jack in between the said projecting portion and the top surface of a tire, so that the expansion of the tire jack will force the tire lips from becoming disengaged from the felly of the wheel or rim.

Another object of my invention is to provide in a tool of the aforementioned character, adjustable clamping means adapted to be secured to rims and wheel flanges of varied widths.

Another object of my invention is to provide a clamping means which engages opposite flanges of a rim or a wheel in triangulated supporting arrangement.

A further object of my invention is to provide a tire tool of the aforementioned character which is adapted to be used in connection with wheels having central hubs therein.

A still further object of my invention is to provide a tool of the aforementioned character, which may be used for removing tires from rims to which they may be secured.

Other objects, and ancillary features inherent in my invention will become apparent from an examination of the accompanying drawings, having further elucidation in the ensuing description, wherein like symbols are used to designate like parts, and in which:

Fig. 1 represents a perspective view of a truck type of wheel, indicating the position of my invention when initiating the removal of the tire from the truck wheel upon which it is mounted.

Fig. 2 is a perspective view of a slightly modified form of my invention in position for initiating the removal of the tire mounted on the truck wheel indicated in that view.

Fig. 3 is a partial and enlarged longitudinal cross-sectional view of the form of my invention illustrated in Fig. 2 in order to depict more clearly a specific feature thereof.

Fig. 3a is a fragmentary side view of a portion of Figure 3, showing the nut removed therefrom, in order to more clearly illustrate the details of this construction.

Fig. 4 is a fragmentary longitudinal cross-sectional view, somewhat enlarged, of the clamping structure indicated in Figure 1.

Fig. 4a is a fragmentary side view of the adjustable locking feature of Fig. 4 shown with the nut removed.

Figure 5:
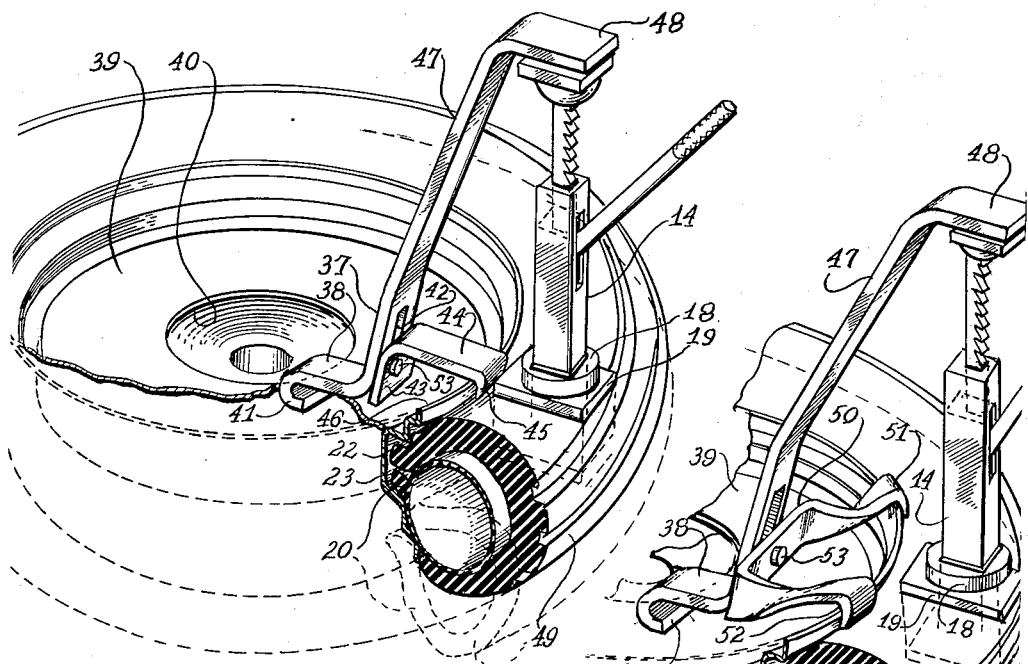
Fig. 5 is a perspective view of a slightly modified clamping structure which may be associated with my invention when used with a hub type of wheel.

Referring to Figures 1, 4, and 4a, a tire wheel is generally designated 8, and is provided with a central hub portion and perimetral openings or recesses 9. My invention is so constructed that its clamping means will pass through the perimetral openings 9 in such a manner, that the frame support 12, having a lower bent portion 32, will permit its lip 33 to engage the flange 11 of the wheel 8.

The mating clamp means used to engage the upper flange 10 of the wheel 8, is designated 24, and has a depending extension 26 suitably drilled in order to receive the locking bolt 27. The upper clamp 24 is also provided with a depending lip 25 in alignment with the lip 33 of the framework, so that the two lips 25 and 33 are secured astraddle the flanges 10 and 11.

The tire 20 having inserted therein the customary inflating tube 21, is provided with the lips 22 and 23 which are secured within the felly portion of the wheel 8. The clamp 24 is secured by virtue of the headed bolt 27, having a square body portion 28, and a reduced threaded portion 30 which is engageable by the lock nut 29.

The frame-work 12 is provided with an elongated slotted portion 31, adapted to ride on the square shank 28, which is indicated as being somewhat shorter than the combined thicknesses of the frame 12 and the clamp projection 26, so as to permit secure tightening of the nut 29, holding the clamp 25 secured to the body 12 in proper spanning distance, so that the lips 25 and 33 will hold firmly the flanges 10 and 11.

The adjustment of the clamp 24 is effectuated by loosening the lock nut and sliding the clamp in the direction required, that is, downwardly to make it smaller, or upwardly to enlarge the gap between the lips 25 and 33. The square bolt 28 and the square openings in the extension 26 of the clamp 24, prevent the clamp 24 from rotating to facilitate the adjustability, as well as locking, or unlocking operation when securing my tool to a wheel.

My frame-work 12 is also provided with a bent extension 12' and an upper right angularly formed ledge 13 engageable by the cap 16 of the movable element 15 of the jack 14. The said element 15 is manipulative, to be extended, or retracted, by virtue of suitable mechanism associated with the lever 17 which is moved in an alternate up and down direction. The jack 14 is provided with a base 18 and it is preferable to insert a plate of suitable dimension, designated 19, so that the force of the jack will be distributed over a greater area of the tire, and if the jack should have a tendency to deviate from its perpendicular position, by hammering the plate 19 inwardly, the jack position will be controlled and the extension thereof will cause the tire 20 to be compressed, and thus permit the lips 22 and 23 to be removed from their anchorage in the felly portion.

The operation is repeated over several portions of the wheel, by inserting my invention or tool in various openings 9, until a sufficient perimetral portion of the tire has been removed from the wheel, and thus the separation of the wheel from the tire may be readily effectuated.

In Figures 2, 3, and 3a the same tool illustrated in Figure 1 is shown used in the same manner, with the exception that the upper clamping element in this instance is designated 36, and is provided with two spanning extensions 35 and 34 which are provided also with lips to fit the upper flange 10 and to straddle the same, so that the clamping portions 35 and 34 are in triangulated arrangement with respect to the centrally positioned clamping lip 33, gripping the flange 11 at the bottom. The retaining and gripping action of this type of construction will afford a more secure clamping action, and in certain instances where large truck tires are to be demounted from wheels, this tool may be found more efficient.

My invention also may be slightly modified with respect to its clamping element, when used in connection with a tire wheel, which has a closed hub or webbed portion, and also may be used for effectually demounting tires from rims which have rather large central openings, said rims being customarily mounted on wheels, and being removably mounted thereon.

Figure 6:
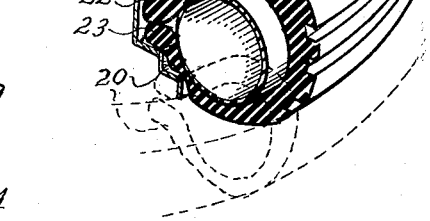
Fig. 6 is a perspective view of a slightly modified form of the upper clamping means used in connection with the structure indicated in Figure 5.

In Figures 5 and 6, perspective views illustrate a slightly modified form of my invention, to be used in connection with a wheel having a tire 49 mounted thereon, and having the upper flange 46 also provided with a closed hub portion 39, having a central opening 40 for mounting the same on the axles.

My invention in this instance comprises a frame-work, having a straight portion 37, angularly bent portion 47, and a straight right angularly formed ledge at the terminus thereof designated 48. The lower portion of the frame element 37 is provided with a right angular extension 38, having a bent over terminal lip portion 41 which is adapted to engage the edge of the opening 40. The portion 37 of the frame-work is provided with an elongated slotted portion 42 and a bolt 53, having a square section engaging the clamp element 44, which has a downwardly depending extension 43, and a clamping lip 45 which engages the flange 46, so that the frame 37 is secured to a hub type of wheel by virtue of clamping the opening in the hub in spanning relationship with the upper flange of the wheel. In this illustration, a standard jack 14 is also used for extension and contraction thereof, in accordance with the elucidation hereinbefore recited for the operation of removing the tire 49 from the wheel 39.

In similar manner as has been indicated for the removal of the tire 20 from the wheel, the tool may be positioned in several locations about the wheel, and by depressing the tire 49, which is first deflated, the lips of the tire are removed from the felly of the wheel, and thus the tire is ultimately removed from its support on the wheel.

This form of my invention may also be slightly modified to utilize more effective gripping action if desirable, by using a dual upper clamp 50 which has the straddling securing extensions 51 and 52, so as to afford a clamping action with respect to the bent lip 41 in triangulated fashion, and afford greater security to provide more efficient action for the jack 14 when it is distended.

Figure 7:
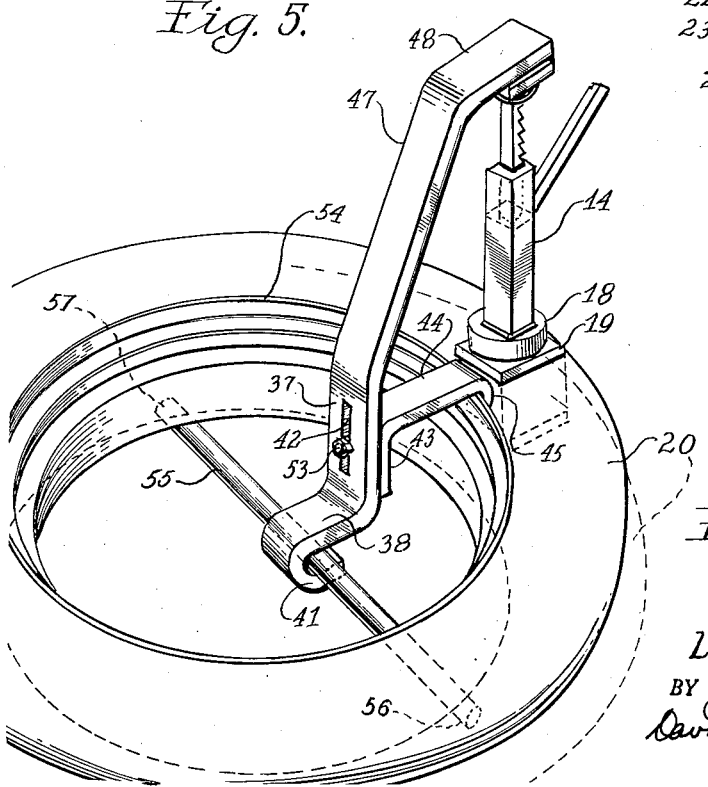
Fig. 7 is a perspective view of the structure illustrated in Figure 5, showing another application thereof, when used in connection with the removal of a tire from an open rim.

Figure 7, merely indicates an application of the same tool illustrated in Figures 5 and 6, when used in connection with a rim. In this case the lip 41 is anchored to an ordinary rod 55, its ends 56 and 57 engaging the lower part of the rim, so as to provide suitable anchorage against the upper ledge 48 thereof when operating the jack 14, to distend the same in order to compress the deflated tire and effect its removal from the rim 54. Thus it can be seen that the lower lips 33 or 41 afford a steadying influence to the assemblage, simultaneously furnishing fixed and rigid association between my tire tool and the tire and its mount or rim.

I believe, I have herein described rather succinctly the nature, operation, and the construction of my tool, and inasmuch as the same is susceptible of modifications, alterations and improvements, I hereby reserve the right to all such modifications, alterations and improvements coming within the scope and spirit of my invention, as well as all those embraced in the accompanying drawings, and any that may fall within the purview of the foregoing description.

Having thus described and revealed my invention, what I claim as novel and desire to secure by Letters Patent, is:

1. In a portable tool for forcing a tire bead from its associated rim flange of a vehicle wheel, a frame-work provided with an angularly bent portion at its bottom terminating in an upturned lip portion for engaging the flange of the said wheel which is oppositely disposed to said first-named flange, the said frame-work including a straight vertical portion having an elongated slot therein, the said straight vertical portion extending upwardly and being bent toward the said lip portion and terminating in a horizontal ledge portion opposing and extending beyond the said lip portion, clamp means having an extension thereof adjustably securable to the said straight vertical portion and further provided with a bent portion terminating in a downturned lip portion disposed oppositely to the said first-mentioned lip portion to engage said first-named flange in straddling relationship with the said first-mentioned lip portion, and bolt means extending through said slot and securing the said clamp means to the said straight vertical portion.

2. In a portable tool for forcing a tire bead from its associated rim flange of a vehicle wheel, a frame-work provided with an angularly bent portion at its bottom terminating in an upturned lip portion for engaging the flange of the said wheel which is oppositely disposed to said first-named flange, the said frame-work including a straight vertical portion having an elongated slot therein, the said straight vertical portion extending upwardly and being bent toward the said lip portion and terminating in a horizontal ledge portion opposing and extending beyond the said lip portion, clamp means having a portion thereof adjustably securable to the said straight vertical portion and further provided with two bent portions terminating in downturned lip portions to engage said first-named flange in straddling and triangulated relationship with the said first-mentioned lip portion to afford a steadying influence to the said frame-work, and bolt means extending through said slot and securing the said clamp means to the said straight vertical portion.

LEONARD VANLEIRSBERGHE.

REFERENCES CITED

The following references are of record in the file of this patent:

UNITED STATES PATENTS

| Number | Name | Date |
|---|---|---|
| 858,449 | Green | June 2, 1907 |
| 1,043,424 | Hevey | Nov. 5, 1912 |
| 1,475,517 | Snider | Nov. 27, 1923 |
| 1,498,816 | Smith et al. | June 24, 1924 |
| 1,507,208 | Schlenker | Sept. 2, 1924 |
| 1,806,947 | Mjelva | May 26, 1931 |
| 1,983,608 | Hand | Dec. 11, 1934 |
| 2,122,388 | Wilkerson | June 28, 1938 |
| 2,319,155 | Passanante et al. | May 11, 1943 |

FOREIGN PATENTS

| Number | Country | Date |
|---|---|---|
| 27,864 | Great Britain | Dec. 7, 1906 |